Patented June 24, 1941

2,247,064

UNITED STATES PATENT OFFICE 2,247,064

ELECTRICALLY INSULATING COMPOSITION

Paul Nowak, Berlin-Charlottenburg, Germany, assignor to General Electric Company, a corporation of New York No Drawing. Application November 2, 1938, Serial No. 238,491. In Germany November 10, 1937

6 Claims. (Cl. 260—42)

This invention relates to electrically insulating compositions and more particularly to synthetic insulating materials comprising polyvinyl halides such, for example, as polyvinyl chloride.

It is known that vinyl chloride and other vinyl halides can be polymerized to form homogeneous, thermo-plastic substances. In order to improve the workability of such polymerized masses, plasticizers or softeners of various kinds have been incorporated therewith. Generally, the higher the plasticizer content the lower are the dielectric properties of the mass. Hence in using polyvinyl chloride or mixed polymerizates containing a considerable proportion of polyvinyl chloride as insulation or sheathing for electric conductors, it is desirable to reduce the plasticizer content of the mass to a minimum, being careful to avoid such proportions as would harmfully affect the mechanical properties of the mass.

In accordance with the present invention electrically insulating compositions comprising plasticized polyvinyl halide of low plasticizer content are formed by incorporating with a polyvinyl halide, specifically polyvinyl chloride, a rubber-like polymer selected from class consisting of polymerized butyl acrylate, polymerized isobutylene and mixtures of polymerized butyl acrylate and polymerized isobutylene. Such polymers surprisingly improve the mechanical properties of the polyvinyl compound, particularly the flexibility and impact strength at low temperatures.

Various proportions of these rubber-like polymers may be incorporated into the insulating compositions of this invention. Ordinarily, however, the amount thereof will not exceed substantially 10 per cent by weight of the polyvinyl chloride or other polyvinyl halide employed, or of a mixed polymerizate containing such polyvinyl compounds, for example a mixture containing, by weight, approximately 80% polymerized vinyl chloride and 20% polymerized ethyl acrylate.

The compositions can be made by mixing the components on hot rolls or in a suitable mixer, for instance a Banbury mixer, until a homogeneous mass has been obtained. Suitable solvents or softeners may be incorporated into the composition, thereby providing an increased plasticity at the beginning of the mixing process and in the subsequent working.

The following examples are illustrative of compositions of this invention:

Example 1

| | Parts by weight |
|---|---|
| Polymerized vinyl chloride | 60 |
| Polymerized butyl acrylate | 5 |
| Tricresyl phosphate | 17.5 |
| Phthalic acid ester (for example, dodecylphthalate) | 17.5 |

Example 2

| | Parts by weight |
|---|---|
| Mixed polymerizate of vinyl chloride and ethyl acrylate, specifically 80 parts polymerized vinyl chloride and 20 parts polymerized ethyl acrylate | 70 |
| Polymerized isobutylene | 3 |
| Tricresyl phosphate | 12 |
| Dodecylphthalate | 7.5 |
| Medianylbenzoate | 7.5 |

Example 3

A mixture of the compositions of Examples 1 and 2 in approximately equal proportions.

Compositions produced as above described can be extruded in a desired wall thickness on a conducting core such as wire as insulation therefor, and at minus 5° C. the insulated wire will resist a weight of 200 grams falling from a height of 20 centimeters without breaking or splitting of the insulation. Compositions containing no polymerized isobutylene or polymerized butyl acrylate, but otherwise the same as set forth under the examples, when similarly applied to wire and tested under comparable conditions fail as electrical insulation. The insulation shatters and cracks under the force of the falling weight. As thus shown, the rubber-like polymers have the unexpected effect of materially improving the impact strength at low temperatures of insulating compositions comprising polyvinyl chloride. The products of this invention have a high dielectric strength and are flexible in thin sheet or strip form over a wide temperature range.

What I claim as new and desire to secure by Letters Patent of the United States is:

1. An electrically insulating composition comprising essentially a polyvinyl halide having incorporated therewith not exceeding substantially 10 per cent by weight thereof of separately polymerized butyl acrylate thereby to increase the low-temperature impact strength of the said composition.

2. An electrically insulating composition comprising essentially polyvinyl chloride and not exceeding substantially 10 per cent by weight thereof of separately polymerized butyl acrylate.

3. An electrically insulating composition adapted to be extruded upon a conducting core and consisting of a plasticized mixture of polyvinyl chloride and separately polymerized butyl acrylate in an amount not exceeding substantially 10 per cent by weight of the polyvinyl chloride.

4. An electrically insulating composition capable of being extruded upon a conducting core and consisting of a mixture of polyvinyl chloride and separately polymerized butyl acrylate in an amount not exceeding substantially 10 per cent by weight of the polyvinyl chloride, and a plasticizer comprising tricresyl phosphate incorporated in the said mixture.

5. An electrically insulating composition consisting of a plasticized mixture of polymerized vinyl chloride and separately polymerized butyl acrylate in the approximate ratio of, by weight, 60 parts of the former to 5 parts of the latter.

6. An electrically insulating composition capable of being extruded upon a conducting core and having a high impact resistance at low temperatures, said composition consisting, by weight, of 60 parts polymerized vinyl chloride, 5 parts separately polymerized butyl acrylate, 17.5 parts tricresyl phosphate and 17.5 parts phthalic acid ester.

PAUL NOWAK.